(12) United States Patent
Mori et al.

(10) Patent No.: US 7,874,814 B2
(45) Date of Patent: Jan. 25, 2011

(54) PISTON PUMP WITH FLUID RESERVOIR

(75) Inventors: Hirotsugu Mori, Kariya (JP); Masayuki Hijikata, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 1165 days.

(21) Appl. No.: 11/402,880

(22) Filed: Apr. 13, 2006

(65) Prior Publication Data

US 2006/0245963 A1    Nov. 2, 2006

(30) Foreign Application Priority Data

Apr. 27, 2005    (JP)  ............... 2005-129049

(51) Int. Cl.
*F04B 1/04*    (2006.01)
*F04B 27/04*    (2006.01)

(52) U.S. Cl. ............... 417/273; 417/470; 92/72; 92/86

(58) Field of Classification Search ............ 417/470, 417/471, 273; 92/72, 86
See application file for complete search history.

(56) References Cited

U.S. PATENT DOCUMENTS 7,313,998 B2 *    1/2008    Dinkel ........................ 92/72

FOREIGN PATENT DOCUMENTS

WO    WO 97/48583    12/1997

* cited by examiner

*Primary Examiner*—Devon C Kramer
*Assistant Examiner*—Peter J Bertheaud
(74) *Attorney, Agent, or Firm*—Posz Law Group, PLC

(57) ABSTRACT

In an electrically-driven piston pump including a fluid reservoir for retaining fluid that has leaked into a cam chamber, at an edge between a side wall surface of the cam chamber and the fluid reservoir, an upper edge, which is positioned on the upper side, is arranged so as to extend downward from the electric motor side toward the side away from the electric motor. With this arrangement, the fluid that has leaked into the cam chamber from a piston bore flows from the electric motor side toward the side away from the electric motor, coursing along the upper edge due to the gravity, and is thus introduced into the fluid reservoir.

3 Claims, 9 Drawing Sheets

PISTON PUMP WITH FLUID RESERVOIR

CROSS REFERENCE TO RELATED APPLICATION

This application is based upon and claims the benefit of Japanese Patent Application No. 2005-129049 filed on Apr. 27, 2005, the content of which are incorporated herein by reference.

FIELD OF THE INVENTION

The present invention relates to a piston pump having a piston reciprocated by an electric motor for sucking up and discharging fluid, which is suitable for increasing the brake fluid pressure in a vehicular brake fluid pressure controlling device that performs, for example, an Anti-lock Brake System (ABS) control.

RELATED ART OF THE INVENTION

In piston pumps used in brake fluid pressure controlling devices according to related art, a cam rotates together with an electric motor, and a piston reciprocates inside a piston bore in accordance with the rotation of the cam, so that the brake fluid is sucked up and discharged. Also, a seal ring is attached to the piston in order to inhibit the brake fluid from leaking through the space between the piston and the piston bore.

As shown in FIG. 14, a housing 4 has a piston bore 42 and also has a cam chamber 41 in which a cam is housed. One end of the cam chamber 41 (located on the right side of FIG. 14) is linked for allowing communication to the internal space within an electric motor (not shown in the drawing). The other end of the cam chamber 41 is closed. The housing 4 also has a fluid reservoir 46 that is formed by depressing a side wall surface of the cam chamber 41 and is used for retaining the brake fluid having leaked into the cam chamber 41 from the piston bore 42.

At the edge (boundary line) between a side wall surface 41a of the cam chamber 41 and the fluid reservoir 46, an upper edge Lu positioned on the upper side extends substantially in a horizontal direction. At the edge between the side wall surface 41a of the cam chamber 41 and the fluid reservoir 46, an electric-motor-side edge Lm positioned on the electric motor side (on the right side in FIG. 14) extends substantially in a vertical direction (See, for example, International Publication Pamphlet No. 97/48583).

With the arrangement of the piston pump according to the related art disclosed in the publication identified above, however, sometimes the brake fluid that has leaked into the cam chamber 41 from the piston bore 42 flows into the internal space within the electric motor, instead of flowing into the fluid reservoir 46.

To be more specific, because liquid generally has a surface tension, any projection, depression, or unevenness impedes the flow of liquid. It is therefore difficult for the brake fluid that has leaked into the cam chamber 41 from the piston bore 42 to flow into the fluid reservoir 46 across the edge between the side wall surface of the cam chamber 41 and the fluid reservoir 46. Thus, when the upper edge Lu extends substantially horizontally, the brake fluid flows toward the bottom of the cam chamber 41, coursing along the upper edge Lu and the electric-motor-side edge Lm, as shown with the arrow with a broken line, and flows into the internal space within the electric motor.

Consequently, a problem arises where some brake fluid sticks to the brush included in the electric motor, and the wear of the brush is accelerated.

SUMMARY OF THE INVENTION

In a piston pump in which a piston is driven by an electric motor, the present invention aims to prevent the wear of the brush included in the electric motor, the wear being caused by the fluid that has leaked into the cam chamber from the piston bore.

A first aspect of the present invention provides a piston pump comprising: a housing; an electric motor connected to the housing; a cam that rotates together with the electric motor; and a piston that reciprocates in accordance with the rotation of the cam so that fluid is drawn in and discharged, wherein the housing includes a cam chamber on one end of which the electric motor is disposed and the other end of which is closed while the cam is housed therein; a piston bore in which the piston is inserted; and a fluid reservoir that is formed by depressing a side wall surface of the cam chamber and is configured to retain fluid that has leaked from the piston bore. According to the first aspect of the present invention, at an edge between the side wall surface of the cam chamber and the fluid reservoir, in the case where an edge positioned on an upper side is defined as an upper edge, a portion of the upper edge that is positioned on an electric motor side with respect to a center of the piston bore extends downward from the electric motor side toward a side away from the electric motor.

With this arrangement, fluid coursing on the portion of the upper edge that is positioned on the electric motor side with respect to the center of the piston bore flows from the electric motor side toward the side away from the electric motor due to the gravity, and subsequently flows into the fluid reservoir.

Incidentally, fluid coursing on a portion of the upper edge that is positioned on the side away from the electric motor with respect to the center of the piston bore flows into the fluid reservoir after having reached the portion of the upper edge that is positioned on the electric motor side with respect to the center of the piston bore in the case where the fluid flows toward the electric motor side, and flows into the fluid reservoir after having reached the closed end face of the cam chamber in the case where the fluid flows toward the side away from the electric motor.

As described above, because the fluid that has leaked into the cam chamber from the piston bore is introduced into the fluid reservoir, it is possible to prevent the fluid from flowing into the internal space within the electric motor. Accordingly, it is possible to prevent the wear of the brush included in the electric motor, the wear being caused by the fluid that has leaked into the cam chamber.

According to a second aspect of the present invention, in the piston pump according to the first aspect of the present invention, the portion of the upper edge that is positioned on the electric motor side with respect to the center of the piston bore and another portion of the upper edge that is positioned on the side away from the electric motor with respect to the center of the piston bore extend continuously downward from the electric motor side toward the side away from the electric motor.

With this arrangement, any fluid coursing on the upper edge flows toward the closed end face side of the cam chamber due to the gravity, and flows into the fluid reservoir, after having reached the closed end face of the cam chamber. Thus, it is possible to prevent the fluid that has leaked into the cam chamber from the piston bore from flowing into the internal space within the electric motor. Accordingly, it is possible to prevent the wear of the brush included in the electric motor, the wear being caused by the fluid that has leaked into the cam chamber.

According to a third aspect of the present invention, in the piston pump according to one of the first aspect and the second aspect of the present invention, an end portion, on the electric motor side, of the upper edge extends closer to the electric motor side with respect to an end portion, on the electric motor side, of a cam-chamber-side opening portion of the piston bore.

Of the fluid that has leaked into the cam chamber from the piston bore, the fluid that has leaked from the end portion, on the electric motor side, of the cam-chamber-side opening portion of the piston bore has the highest possibility of flowing toward the electric motor side. According to the third aspect of the present invention, the fluid that has leaked from the end portion, on the electric motor side, of the cam-chamber-side opening portion of the piston bore reaches the upper edge, after flowing downward coursing on the side wall surface of the cam chamber. Thus, it is possible to prevent the fluid that has leaked into the cam chamber from the piston bore from flowing into the internal space within the electric motor. Accordingly, it is possible to prevent the wear of the brush included in the electric motor, the wear being caused by the fluid that has leaked into the cam chamber.

A fourth aspect of the present invention provides a piston pump comprising: a housing; an electric motor connected to the housing; a cam that rotates together with the electric motor; and a piston that reciprocates in accordance with the rotation of the cam so that fluid is sucked up and discharged, wherein the housing includes a cam chamber on one end of which the electric motor is disposed and the other end of which is closed while the cam is housed therein; a piston bore one end of which is open to a side wall surface of the cam chamber and in which the piston is inserted; a fluid reservoir that is formed by depressing the side wall surface of the cam chamber and is configured to retain fluid that has leaked into the cam chamber from the piston bore; and a communication groove that allows communication between a cam-chamber-side opening portion of the piston bore and the fluid reservoir.

With this arrangement, because the fluid that has leaked into the cam chamber from the piston bore is introduced into the fluid reservoir via the communication groove, it is possible to prevent the fluid from flowing into the internal space within the electric motor. Accordingly, it is possible to prevent the wear of the brush included in the electric motor, the wear being caused by the fluid that has leaked into the cam chamber.

A fifth aspect of the present invention provides a piston pump comprising: a housing; an electric motor connected to the housing; a cam that rotates together with the electric motor; and a piston that reciprocates in accordance with the rotation of the cam so that fluid is sucked up and discharged, wherein the housing includes a cam chamber on one end of which the electric motor is disposed and the other end of which is closed while the cam is housed therein; a piston bore one end of which is open to a side wall surface of the cam chamber and in which the piston is inserted; a fluid reservoir that is formed by depressing the side wall surface of the cam chamber and is configured to retain fluid that has leaked into the cam chamber from the piston bore, and wherein a cam-chamber-side opening portion of the piston bore is open to the fluid reservoir.

With this arrangement, because the fluid that has leaked into the cam chamber from the piston bore directly flows into the fluid reservoir, it is possible to prevent the fluid from flowing into the internal space within the electric motor. Accordingly, it is possible to prevent the wear of the brush included in the electric motor, the wear being caused by the fluid that has leaked into the cam chamber.

According to a sixth aspect of the present invention, in the piston pump according to the fifth aspect of the present invention, a whole of the cam-chamber-side opening portion of the piston bore is open to the fluid reservoir. With this arrangement, it is possible to obtain the effect according to the fifth aspect of the present invention with an even higher degree of certainty.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
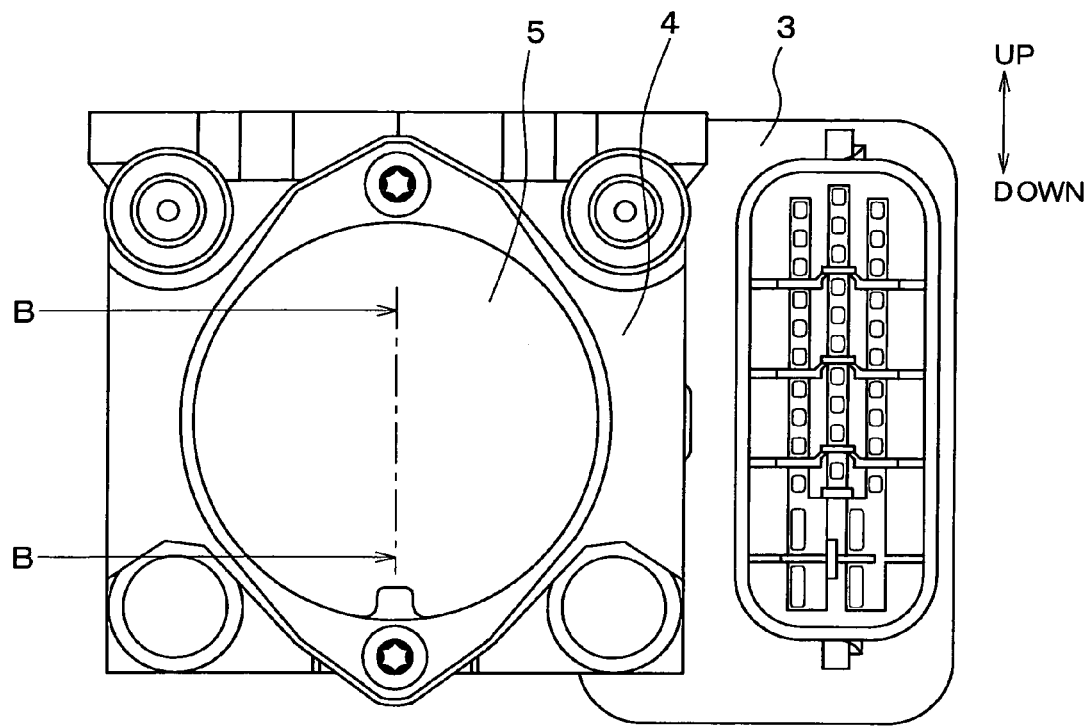
FIG. 1 is a front view of a vehicular brake fluid pressure controlling device that includes a piston pump according to a first embodiment of the present invention.

The present invention will be described further with reference to various embodiments in the drawings.

First Embodiment

The following describes a first embodiment of the present invention. FIG. 1 is a front view of a vehicular brake fluid pressure controlling device that includes a piston pump according to the first embodiment of the present invention.

Figure 2:
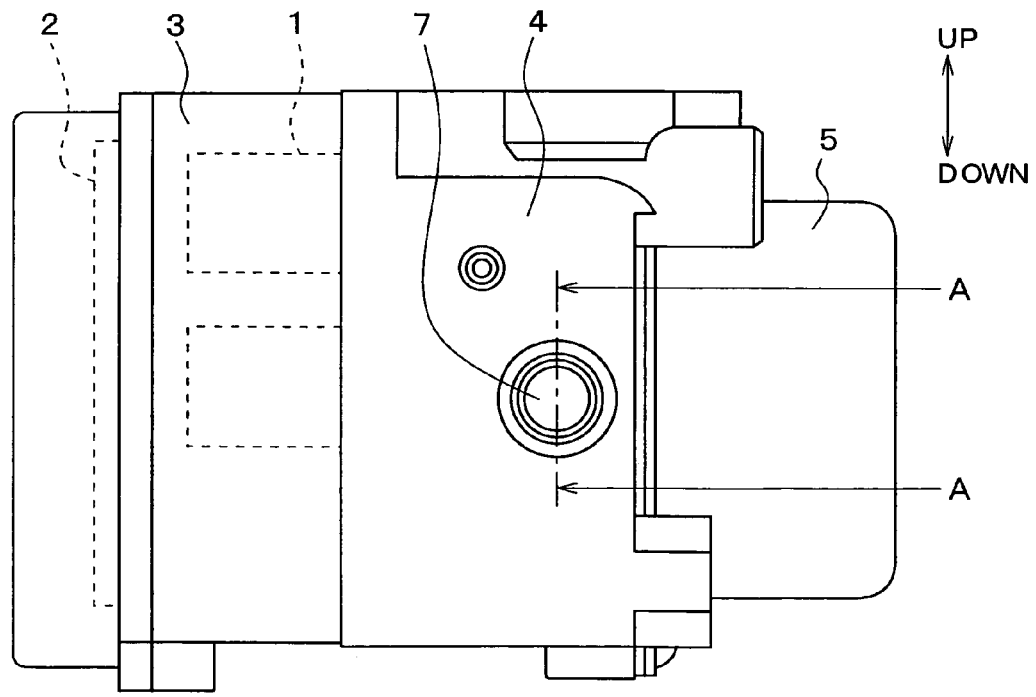
FIG. 2 is a left side view of the vehicular brake fluid pressure controlling device shown in FIG. 1.
Figure 3:
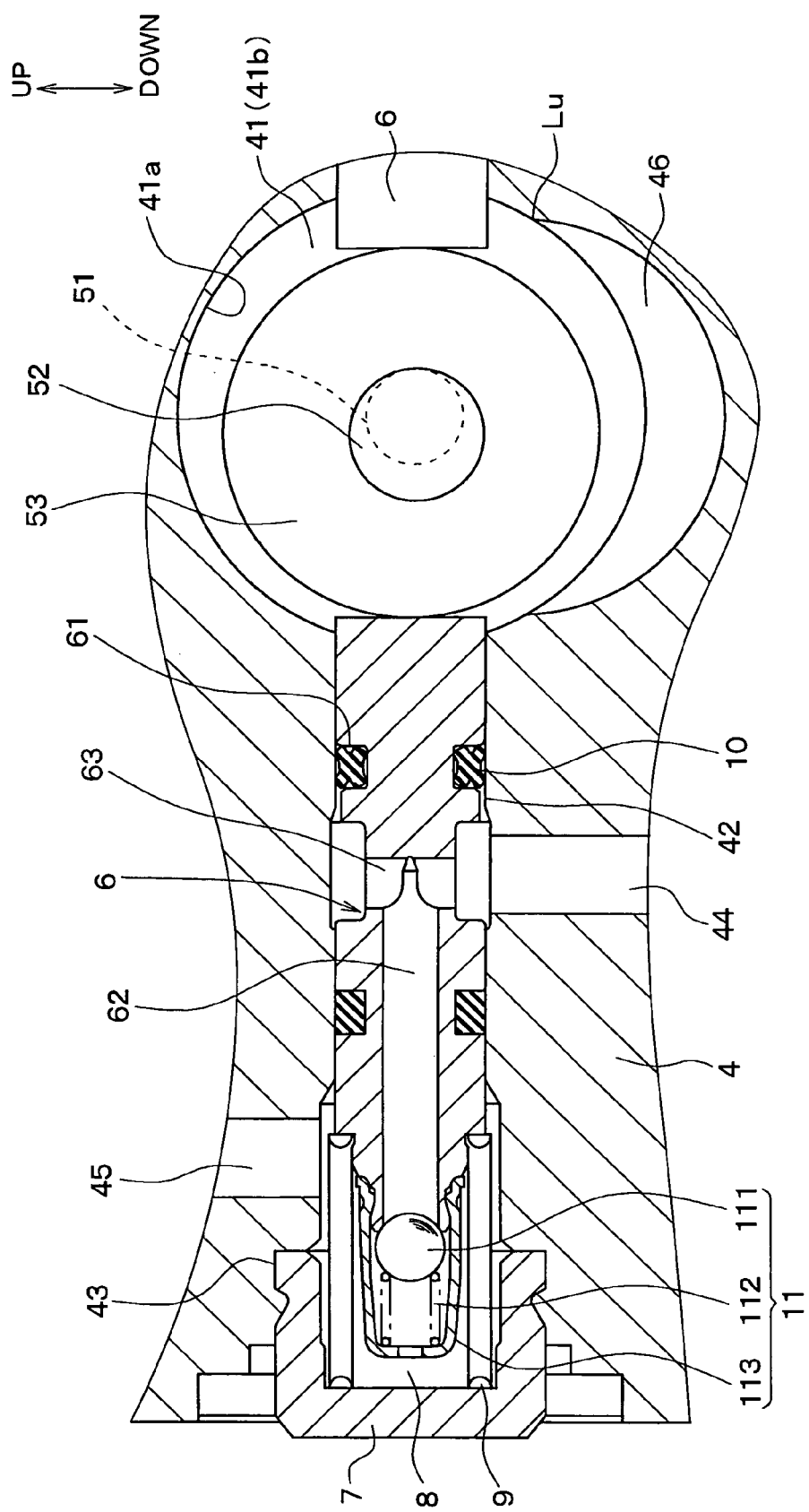
FIG. 3 is a cross sectional view, taken along line A-A in FIG. 2, of the piston pump included in the vehicular brake fluid pressure controlling device shown in FIG. 1.
Figure 4:
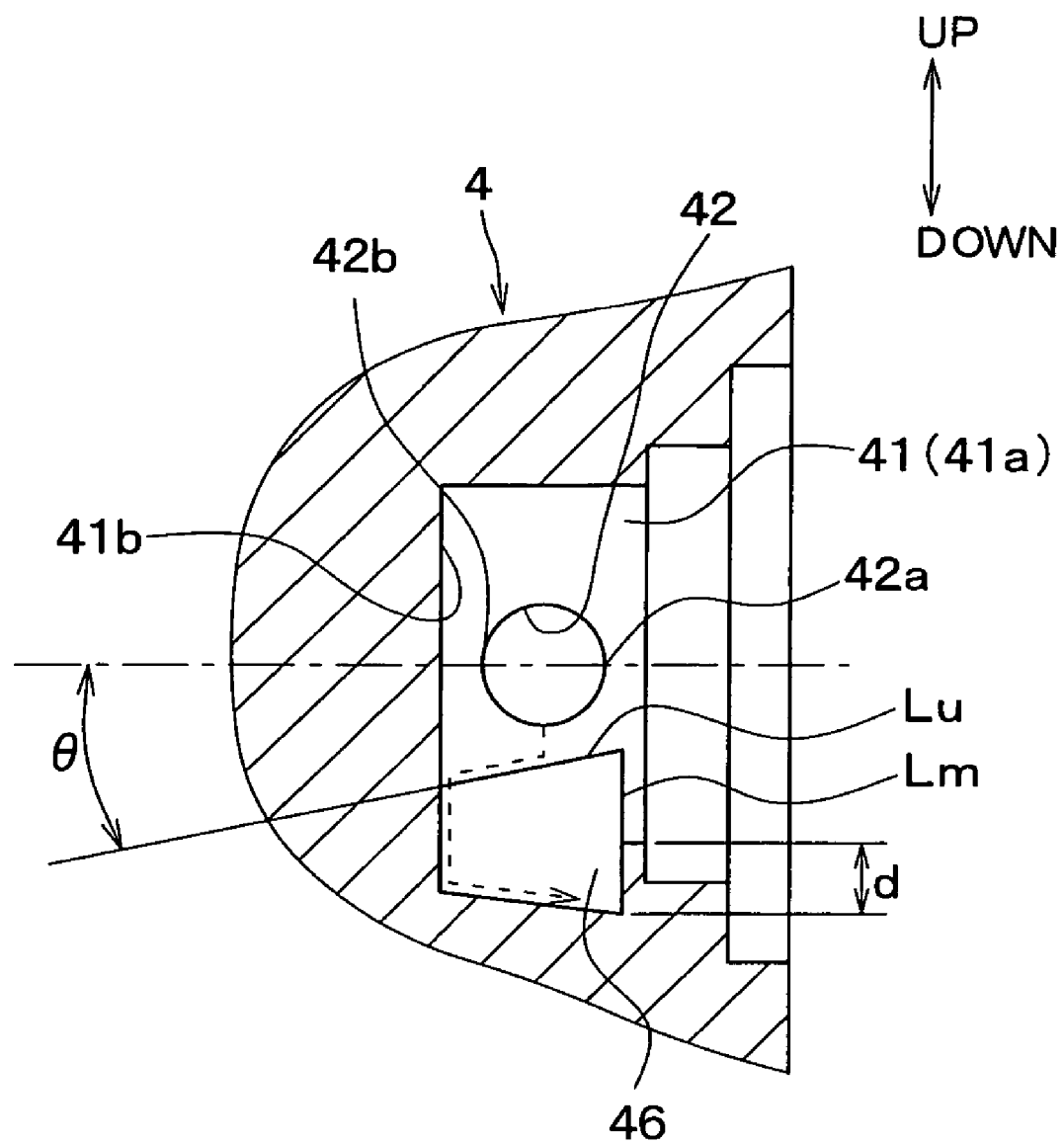
FIG. 4 is a cross sectional view, taken along line B-B in FIG. 1, of a housing included in the vehicular brake fluid pressure controlling device shown in FIG. 1.

FIG. 2 is a left side view of the vehicular brake fluid pressure controlling device shown in FIG. 1. FIG. 3 is a cross sectional view, taken along line A-A in FIG. 2, of the piston pump included in the vehicular brake fluid pressure controlling device shown in FIG. 1. FIG. 4 is a cross sectional view, taken along line B-B in FIG. 1, of a housing included in the device shown in FIG. 1. FIG. 5 is a cross sectional view for showing how to process the fluid reservoir shown in FIG. 3. It should be noted that the up and down directions shown with the arrows in the drawings correspond to the up and down directions when the device is installed in a vehicle.

The brake fluid pressure controlling device shown in FIG. 1 and FIG. 2 is used for, for example, performing ABS control, and includes a pump for increasing the brake fluid pressure, a plurality of electromagnetic valves 1 for opening and closing the passage of the brake fluid, an electronic controlling device 2 for controlling the operation of the electromagnetic valves 1 and the like, and a cover 3 that covers the electromagnetic valves 1 and the electronic controlling device 2.

The pump includes a housing 4, an electric motor 5 connected to one end of the housing 4 with bolts, and a piston that is housed in the housing 4 and is driven by the electric motor 5.

As shown in FIG. 3, the electric motor 5 has a rotation shaft 51 disposed substantially horizontally. An eccentric shaft portion 52, which is eccentric to the rotation center of the rotation shaft 51, is integrally formed with the rotation shaft 51. A bearing 53 that has a circular cylindrical shape and is made of metal such as bearing steel is pressed fit on the outer circumference of the eccentric shaft portion 52. The eccentric shaft portion 52 and the bearing 53 correspond to a cam according to the present invention.

As shown in FIG. 3 and FIG. 4, the housing 4 is made of aluminum and has a cam chamber 41 in which the eccentric shaft portion 52 and the bearing 53 are disposed. The cam chamber 41 is in the shape of a circular cylindrical hollow of which one end is open and the other end is closed, and extends in the horizontal direction so as to be parallel to the axis of the rotation shaft 51. The electric motor 5 is connected to the housing 4 so as to cover the opening portion on the one end of the cam chamber 41. The cam chamber 41 is linked for allowing communication, to the internal space within the electric motor 5 via the opening portion on the one end thereof.

The housing 4 has piston bores 42 each of which is in the shape of a circular cylindrical hollow and that extend, on either side of the rotation shaft 51 at symmetrical positions, in the horizontal direction so as to be orthogonal to the axis of the rotation shaft 51.

One end of the piston bore 42 is open to a side wall surface 41a of the cam chamber 41. One end face of a piston 6 (to be described in detail later), which is inserted in the piston bore 42, is configured to abut against the bearing 53. The piston 6 reciprocates as the bearing 53 rotates together with the rotation shaft 51.

As shown in FIG. 3, a plug hole 43 in the shape of a circular cylindrical hollow is formed on the other end of the piston bore 42. A plug 7 is inserted and fixed in the plug hole 43 so that the other end of the piston bore 42 is closed. A pump chamber 8 is formed as being partitioned by the plug 7, the piston bore 42, and the other end face of the piston 6.

The housing 4 has a suction passage 44 that opens to a portion of the piston bore 42 where the piston 6 makes a sliding motion and also a discharge passage 45 that opens to the pump chamber 8. Because of the reciprocating motion of the piston 6, the brake fluid is sucked into the pump chamber 8 through the suction passage 44 and the like, and the brake fluid of which the pressure has been increased is discharged from the pump chamber 8 into the discharge passage 45.

The piston 6 is in the shape of a stepped circular cylinder and is made of metal such as chromium steel. The piston 6 is biased toward the bearing 53 side by a spring 9 provided in the pump chamber 8.

The outer surface of the piston 6 has an annular housing groove 61 in which a seal ring 10 made of rubber is housed. Because the outer surface of the seal ring 10 is configured to abut against the inner surface of the piston bore 42, and also because the inner surface of the seal ring 10 is configured to abut against the surface of the housing groove 61, the brake fluid is prevented from leaking from the pump chamber 8 to the cam chamber 41 side.

The piston 6 has a longitudinal hole 62 that extends in the axial direction thereof. One end of the longitudinal hole 62 is linked for allowing communication to the suction passage 44 via a transversal hole 63 in the piston 6. The other end of the longitudinal hole 62 is open to the pump chamber 8.

A check valve 11 is provided at the opening portion on the pump chamber 8 side of the longitudinal hole 62 so as to allow the brake fluid to flow only from the suction passage 44 through the transversal hole 63 and the longitudinal hole 62 to the pump chamber 8. The check valve 11 includes a ball 111 that is in and out of contact with an end face of the opening portion of the longitudinal hole 62, a spring 112 that makes the ball 111 biased toward the end face of he opening portion of the longitudinal hole 62, and a cover 113 that holds the spring 112.

As shown in FIG. 3 and FIG. 4, the housing 4 has a fluid reservoir 46 that is formed by depressing the side wall surface 41a on the bottom side of the cam chamber 41. The fluid reservoir 46 is used for retaining the brake fluid that has leaked into the cam chamber 41 from the pump chamber 8 side through the piston bore 42, and corresponds to the fluid reservoir of the present invention.

Figure 5A:
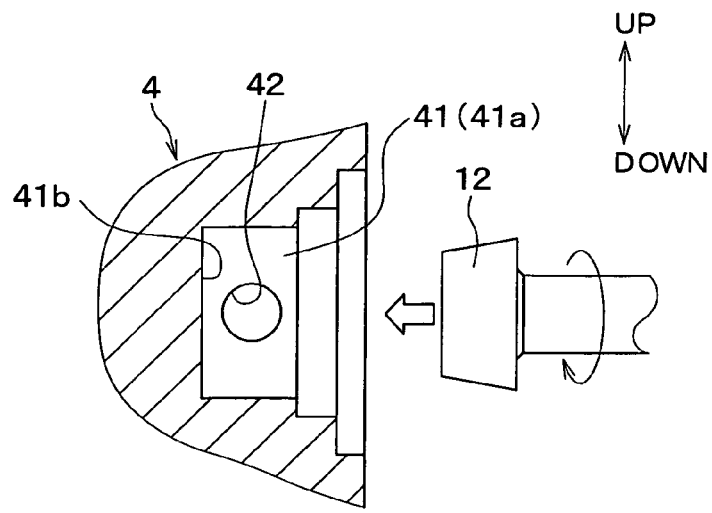
FIGS. 5A, 5B, and 5C are cross sectional views for showing how to process the fluid reservoir shown in FIG. 3.
Figure 5B:
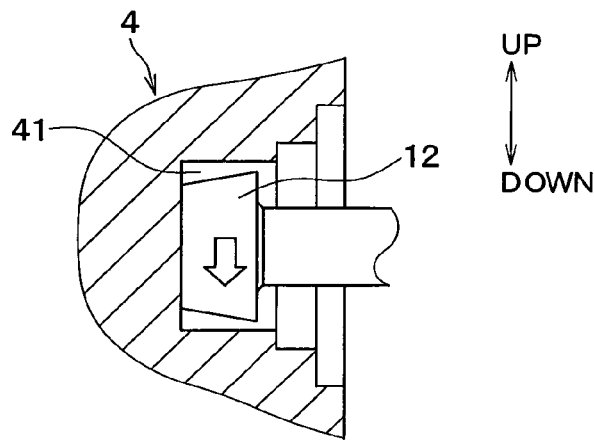
Figure 5C:
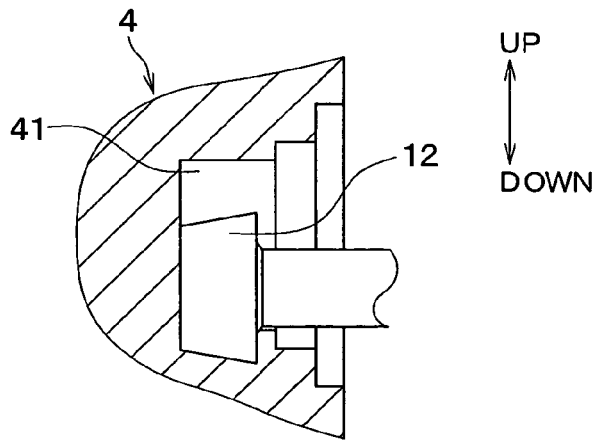

FIGS. 5A, 5B, and 5C show forming process that shows how to form the fluid reservoir 46. Used in this process is a cutting tool 12 that has a tapered shape or is in the shape of a circular truncated cone, which is tapered from the side corresponding to the one end of the cam chamber 41 to the other side corresponding to the other end of the cam chamber 41, in other words, tapered from the electric motor side to the side away from the electric motor.

Firstly, as shown in FIG. 5A and FIG. 5B, the cutting tool 12 is moved, while being rotated, from the electric motor side toward the side away from the electric motor, along the axial direction of the rotation shaft 51, so that the cutting tool 12 is put into the cam chamber 41 until the tip of the cutting tool 12 abuts against the closed end face 41b of the cam chamber 41.

Next, as shown in FIG. 5B and FIG. 5C, the cutting tool 12 is moved downward in a direction orthogonal to the axis of the rotation shaft 51, so that the side wall surface 41a on the bottom side of the cam chamber 41 is cut and thus the fluid reservoir 46 is formed at the bottom of the cam chamber 41.

The specific configuration of the fluid reservoir 46 formed in the above manner will be described with reference to FIG. 3 and FIG. 4.

In the following explanation, at the edge (boundary line) between the side wall surface 41a of the cam chamber 41 and the fluid reservoir 46, the edge positioned on the upper side will be referred to as the upper edge Lu. At the edge between the side wall surface 41a of the cam chamber 41 and the fluid reservoir 46, the edge positioned on the electric motor side will be referred to as the electric-motor-side edge Lm.

The end portion, on the electric motor side, of the upper edge Lu extends closer to the electric motor side with respect to the end portion 42a, on the electric motor side, of the cam-chamber-side opening portion of the piston bore 42. On the other hand, the end portion, on the side away from the electric motor, of the upper edge Lu extends closer to the side away from the electric motor with respect to the end portion 42b, on the side away from the electric motor, of the cam-chamber-side opening portion of the piston bore 42, and more specifically, extends up to the closed end face 41b of the cam chamber 41.

Also, the upper edge Lu extends downward, continuously and linearly, from the side corresponding to the one end of the cam chamber 41 toward the other side corresponding to the other end of the cam chamber 41, in other words, from the electric motor side toward the side away from the electric motor.

The electric-motor-side edge Lm extends substantially vertically from the end portion, on the electric motor side, of the edge Lu.

Incidentally, it is preferable that the inclination angle θ of the upper edge Lu with respect to the axis of the rotation shaft 51 is 7° or larger. It is also preferable to have an arrangement wherein the depth d of the fluid reservoir 46 is 2 to 3 millimeters.

Next, the operation of the pump included in the vehicular brake fluid pressure controlling device having the above configuration will be described.

When the eccentric shaft portion 52 and the bearing 53 are rotated by the electric motor 5, the piston 6 reciprocates inside the piston bore 42. In the suction stroke in which the piston 6 is pushed back toward the bearing 53 side by the spring 9, because the pressure in the pump chamber 8 becomes lower than the pressure in the suction passage 44, the ball 111 included in the check valve 11 comes out of contact with the opening portion of the longitudinal hole 62, so that the check valve 11 opens. Consequently, the brake fluid is drawn into the pump chamber 8 through the suction passage 44 via the transversal hole 63 and the longitudinal hole 62.

On the other hand, in the discharge stroke in which the piston 6 is pushed out toward the plug 7 side by the bearing 53, the ball 111 included in the check valve 11 comes in contact with the opening portion of the longitudinal hole 62, so that the check valve 11 closes. Consequently, the brake fluid of which the pressure has been increased in the pump chamber 8 is discharged into the discharge passage 45.

The pump is configured so that the brake fluid is prevented, by the seal ring 10, from leaking from the pump chamber 8 into the cam chamber 41. However, it is not possible to completely prevent the brake fluid from leaking, so that a small amount of brake fluid leaks into the cam chamber 41 through the space between the piston 6 and the piston bore 42.

As shown in FIG. 4 with the arrow with a broken line, firstly, the brake fluid that has leaked into the cam chamber 41 goes downward from the cam-chamber-side opening portion of the piston bore 42, coursing on the side wall surface 41a of the cam chamber 41, and reaches the upper edge Lu.

Next, the brake fluid having reached the upper edge Lu flows from the electric motor side toward the side away from the electric motor, coursing along the upper edge Lu. In other words, the brake fluid flows toward the closed end face 41b side of the cam chamber 41, coursing along the upper edge Lu, and after having reached the closed end face 41b of the cam chamber 41, the brake fluid goes downward, coursing on the closed end face 41b so as to flow into the fluid reservoir 46 and to be retained in the fluid reservoir 46.

As described above, because the brake fluid that has leaked into the cam chamber 41 from the piston bore 42 is introduced into the fluid reservoir 46, it is possible to prevent the brake fluid from flowing into the internal space within the electric motor 5. Thus, it is possible to prevent the wear of the brush included in the electric motor 5, the wear being caused by the brake fluid that has leaked into the cam chamber 41.

Of the brake fluid that has leaked into the cam chamber 41 from the piston bore 42, the brake fluid that has leaked from the end portion 42a, on the electric motor side, of the cam-chamber-side opening portion of the piston bore 42 has the highest possibility of flowing toward the electric motor 5.

To address this, according to the present embodiment, the end portion, on the electric motor side, of the upper edge Lu extends closer to the electric motor side with respect to the end portion 42a, on the electric motor side, of the cam-chamber-side opening portion of the piston bore 42.

With this arrangement, the brake fluid that has leaked from the end portion 42a, on the electric motor side, of the cam-chamber-side opening portion of the piston bore 42 reaches the upper edge Lu, after flowing downward coursing on the side wall surface 41a of the cam chamber 41. Thus, it is possible to prevent the brake fluid, which has leaked into the cam chamber 41 from the piston bore 42, from flowing into the internal space within the electric motor 5. Accordingly, it is possible to prevent the wear of the brush included in the electric motor 5, the wear being caused by the brake fluid that has leaked into the cam chamber 41.

Second Embodiment

Figure 6:
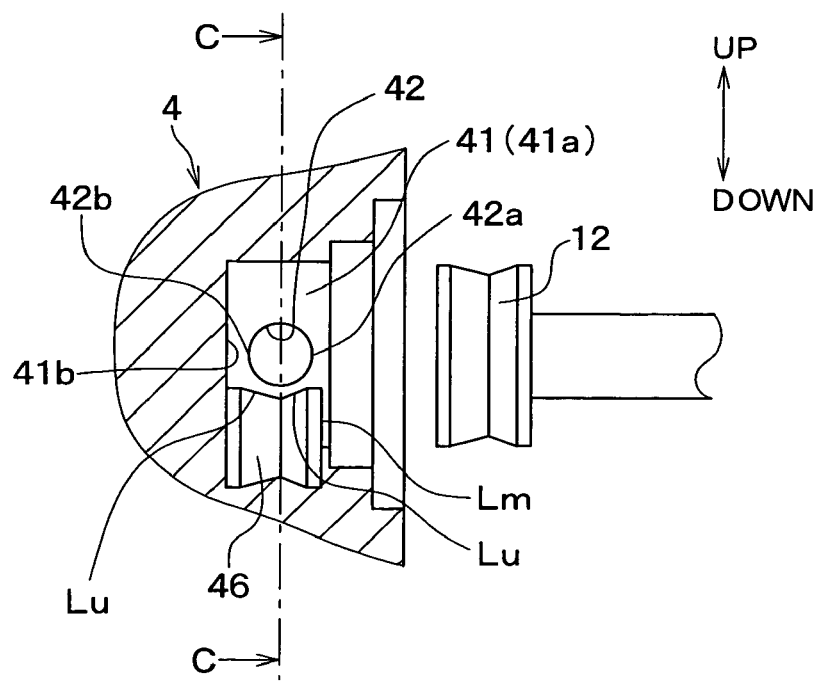
FIG. 6 is a cross sectional view for showing a configuration of a housing included in a piston pump and how to process a fluid reservoir according to a second embodiment of the present invention.
Figure 7:
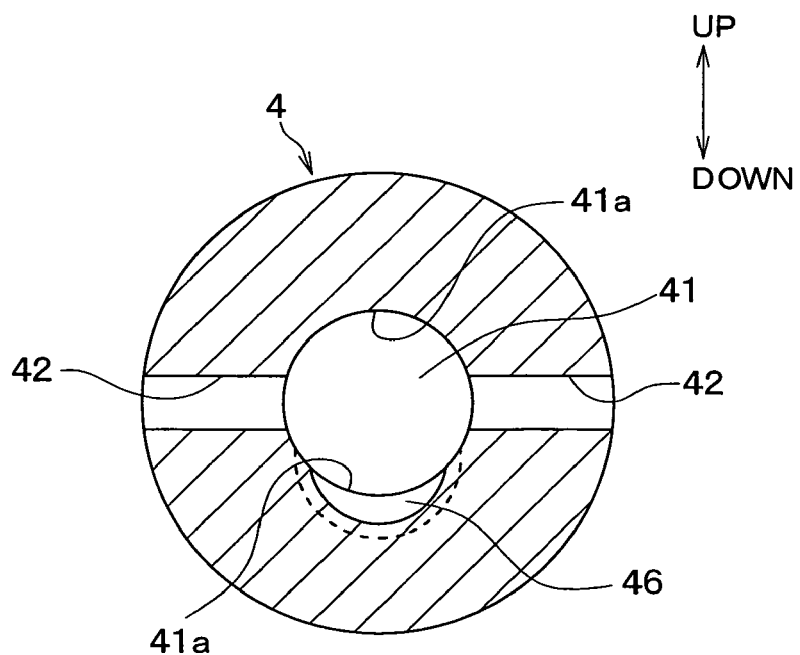
FIG. 7 is a cross sectional view of the housing shown in FIG. 6 taken along line C-C.

The following describes a second embodiment of the present invention. FIG. 6 is a cross sectional view for showing a configuration of a housing included in a piston pump and how to process a fluid reservoir according to the second embodiment. FIG. 7 is a cross sectional view of the housing shown in FIG. 6 taken along line C-C. The elements that are the same as, or equivalent to, those in the first embodiment will be referred to using the same reference characters, and explanation thereof will be omitted.

As described in detail below, the shape of the fluid reservoir 46 according to the second embodiment is different from the one according to the first embodiment.

As shown in FIG. 6 and FIG. 7, according to the present embodiment, the cutting tool 12 that has an hourglass-like shape, narrowed at the middle portion in the axial direction of the rotation shaft 51, is used. In order to form the fluid reservoir 46 at the bottom of the cam chamber 41, the cutting tool 12 is moved, while being rotated, in the same manner as described in the first embodiment.

The narrowest portion of the fluid reservoir 46 is positioned beneath the center of the piston bore 42. A portion of the upper edge Lu that is positioned on the electric motor side with respect to the center of the piston bore 42, in other words, a portion of the upper edge Lu that is positioned on the electric motor side with respect to the narrowest portion of the fluid reservoir 46, extends downward from the electric motor side toward the side away from the electric motor.

On the other hand, a portion of the upper edge Lu that is positioned on the side away from the electric motor with respect to the center of the piston bore 42, in other words, a portion of the upper edge Lu that is positioned on the side away from the electric motor with respect to the narrowest portion of the fluid reservoir 46, extends downward from the side away from the electric motor toward the electric motor side.

With this arrangement, firstly, the brake fluid that has leaked into the cam chamber 41 flows downward from the cam-chamber-side opening portion of the piston bore 42, coursing on the side wall surface 41a of the cam chamber 41, and reaches the upper edge Lu.

Next, the brake fluid that has reached the portion of the upper edge Lu that is positioned on the electric motor side with respect to the narrowest portion of the fluid reservoir 46 flows toward the side corresponding to the narrowest portion of the fluid reservoir 46, coursing along the upper edge Lu, and then flows into the fluid reservoir 46.

On the other hand, the brake fluid that has reached the portion of the upper edge Lu that is positioned on the side away from the electric motor with respect to the narrowest portion of the fluid reservoir 46 also flows toward the side corresponding to the narrowest portion of the fluid reservoir 46, coursing along the upper edge Lu, and then flows into the fluid reservoir 46.

As described above, because the brake fluid that has leaked into the cam chamber 41 from the piston bore 42 is introduced into the fluid reservoir 46, it is possible to prevent the brake fluid from flowing into the internal space within the electric motor 5. Accordingly, it is possible to prevent the wear of the brush included in the electric motor 5, the wear being caused by the brake fluid that has leaked into the cam chamber 41.

Third Embodiment

Figure 8:
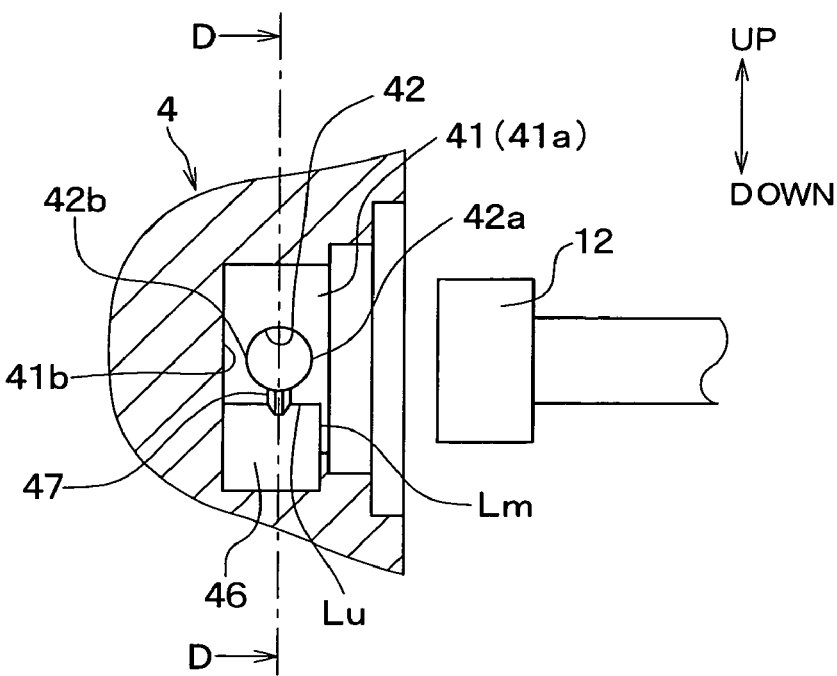
FIG. 8 is a cross sectional view for showing a configuration of a housing included in a piston pump and how to process a fluid reservoir according to a third embodiment of the present invention.
Figure 9:
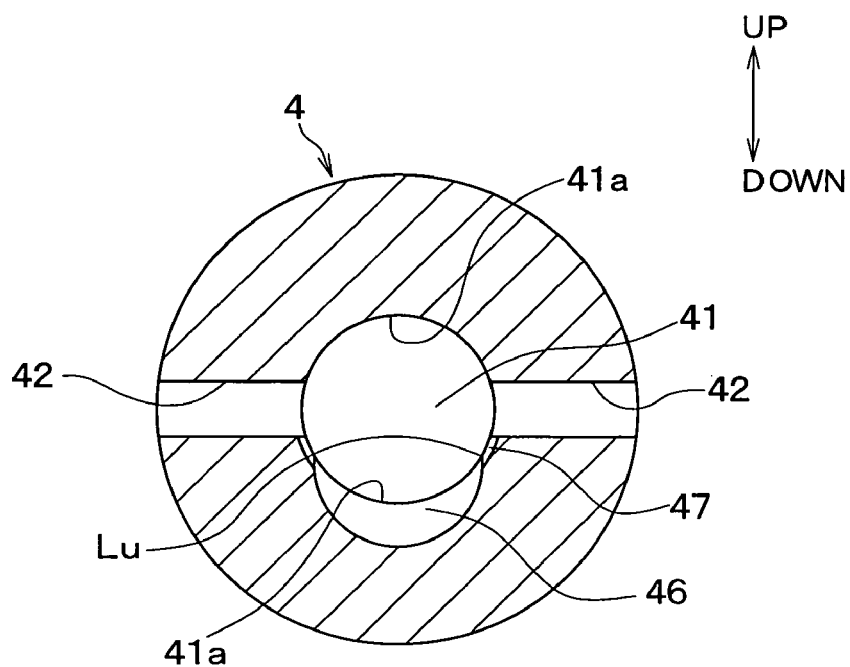
FIG. 9 is a cross sectional view of the housing shown in FIG. 8 taken along line D-D.

The following describes a third embodiment of the present invention. FIG. 8 is a cross sectional view for showing a configuration of a housing included in a piston pump and how to process a fluid reservoir according to the third embodiment. FIG. 9 is a cross sectional view of the housing shown in FIG. 8 taken along line D-D. The elements that are the same as, or equivalent to, those in the first embodiment will be referred to using the same reference characters, and explanation thereof will be omitted.

As described in detail below, the shape of the fluid reservoir 46 according to the third embodiment is different from the one according to the first embodiment, and also a communication groove 47 that allows communication between the cam-chamber-side opening portion of the piston bore 42 and the fluid reservoir 46 is added.

As shown in FIG. 8 and FIG. 9, according to the present embodiment, the cutting tool 12 that has a circular cylindrical shape with a constant diameter is used. In order to form the fluid reservoir 46 at the bottom of the cam chamber 41, the cutting tool 12 is moved, while being rotated, in the same manner as described in the first embodiment. Because the cutting tool 12 has a circular cylindrical shape with a constant diameter, the upper edge Lu extends substantially horizontally.

Subsequently, the side wall surface 41a positioned between the cam-chamber-side opening portion of the piston bore 42 and the upper edge Lu is cut using a cutting tool (not shown in the drawing), so that the communication groove 47 that allows communication between the cam-chamber-side opening portion of the piston bore 42 and the fluid reservoir 46 is formed.

With this arrangement, because the brake fluid that has leaked into the cam chamber 41 is introduced into the fluid reservoir 46 via the communication groove 47, it is possible to prevent, the brake fluid from flowing into the internal space within the electric motor 5. Accordingly, it is possible to prevent the wear of the brush included in the electric motor 5, the wear being caused by the brake fluid that has leaked into the cam chamber 41.

Fourth Embodiment

Figure 10:
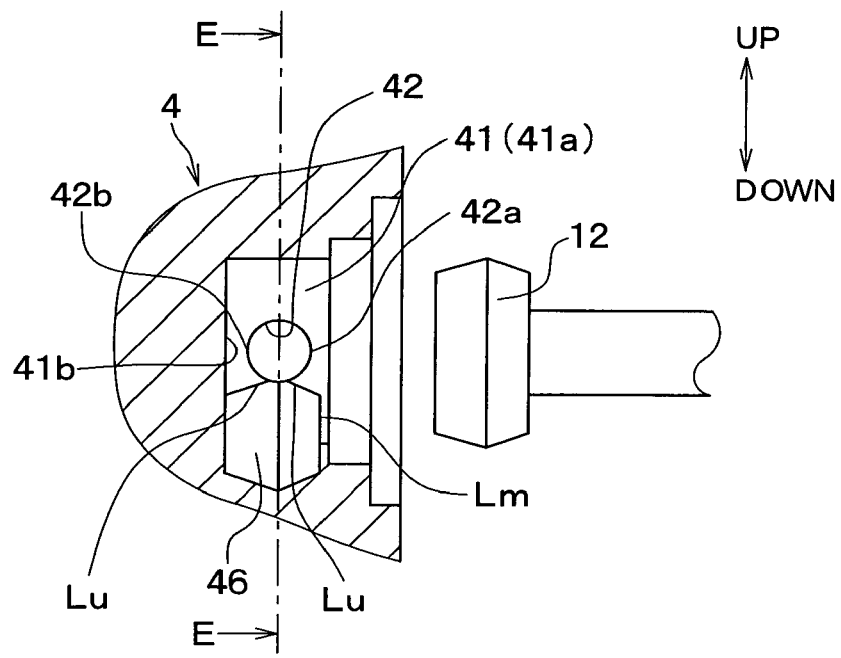
FIG. 10 is a cross sectional view for showing a configuration of a housing included in a piston pump and how to process a fluid reservoir according to a fourth embodiment of the present invention.
Figure 11:
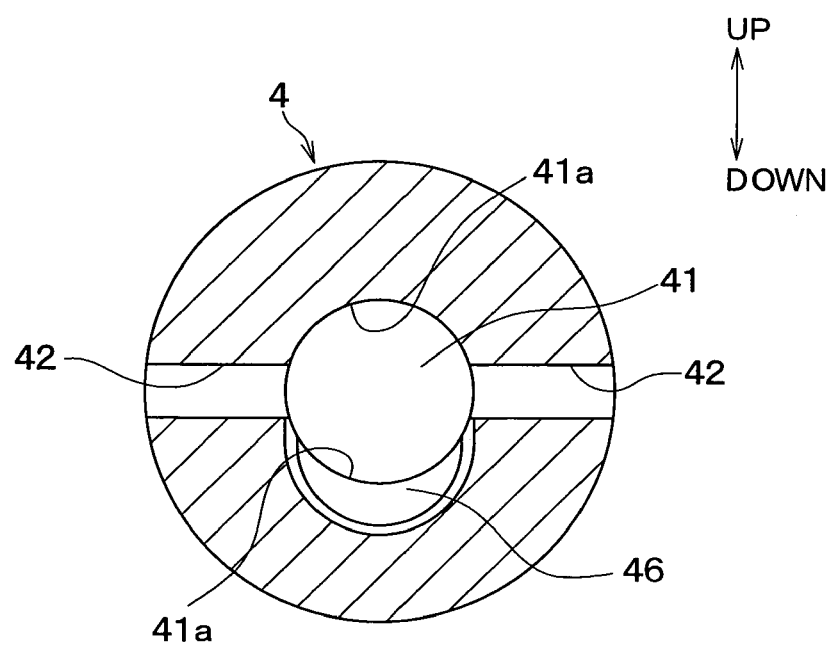
FIG. 11 is a cross sectional view of the housing shown in FIG. 10 taken along line E-E.

The following describes a fourth embodiment of the present invention. FIG. 10 is a cross sectional view for showing a configuration of a housing included in a piston pump and how to process a fluid reservoir according to the fourth embodiment. FIG. 11 is a cross sectional view of the housing shown in FIG. 10 taken along line E-E. The elements that are the same as, or equivalent to, those in the first embodiment will be referred to using the same reference characters, and explanation thereof will be omitted.

As described in detail below, the shape and the positional arrangement of the fluid reservoir 46 according to the fourth embodiment are different from those according to the first embodiment.

As shown in FIG. 10 and FIG. 11, according to the present embodiment, the cutting tool 12 that has a barrel-like shape, widened at the middle portion in the axial direction of the rotation shaft 51, is used. In order to form the fluid reservoir 46 at the bottom of the cam chamber 41, the cutting tool 12 is moved, while being rotated, in the same manner as described in the first embodiment.

The widest portion of the fluid reservoir 46 is directly linked for allowing communication to the cam-chamber-side opening portion of the piston bore 42. In other words, the cam-chamber-side opening portion of the piston bore 42 is directly open to the fluid reservoir 46.

Incidentally, according to the present embodiment, a portion of the upper edge Lu that is positioned on the electric motor side with respect to the widest portion of the fluid reservoir 46 extends downward from the side away from the electric motor toward the electric motor side. On the other hand, a portion of the upper edge Lu that is positioned on the side away from the electric motor with respect to the widest portion of the fluid reservoir 46 extends downward from the electric motor side toward the side away from the electric motor.

With this arrangement, because the brake fluid that has leaked into the cam chamber 41 directly flows into the fluid reservoir 46 from the cam-chamber-side opening portion of the piston bore 42, it is possible to prevent the brake fluid from flowing into the internal space within the electric motor 5. Accordingly, it is possible to prevent the wear of the brush included in the electric motor 5, the wear being caused by the brake fluid that has leaked into the cam chamber 41.

Fifth Embodiment

Figure 12:
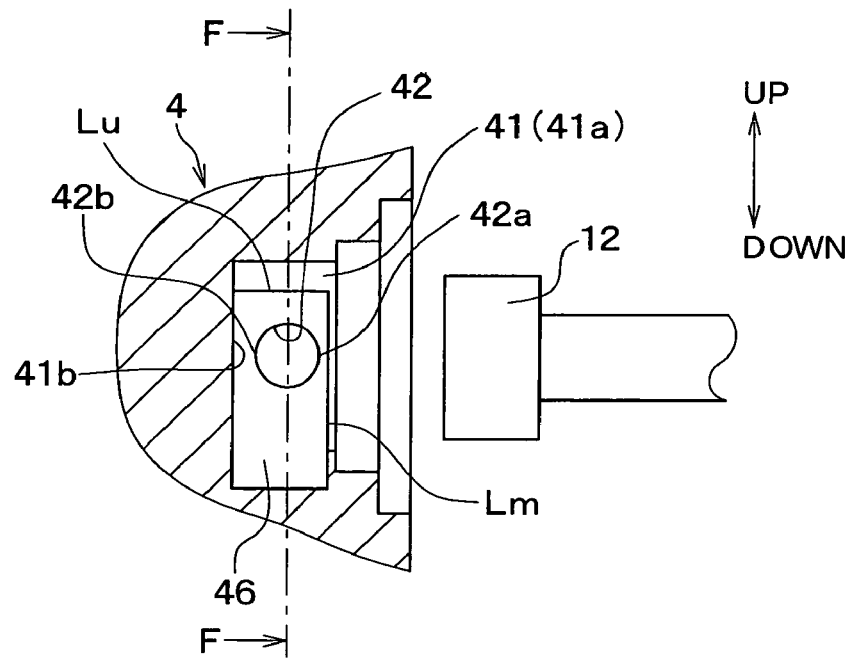
FIG. 12 is a cross sectional view for showing a configuration of a housing included in a piston pump and how to process a fluid reservoir according to a fifth embodiment of the present invention.
Figure 13:
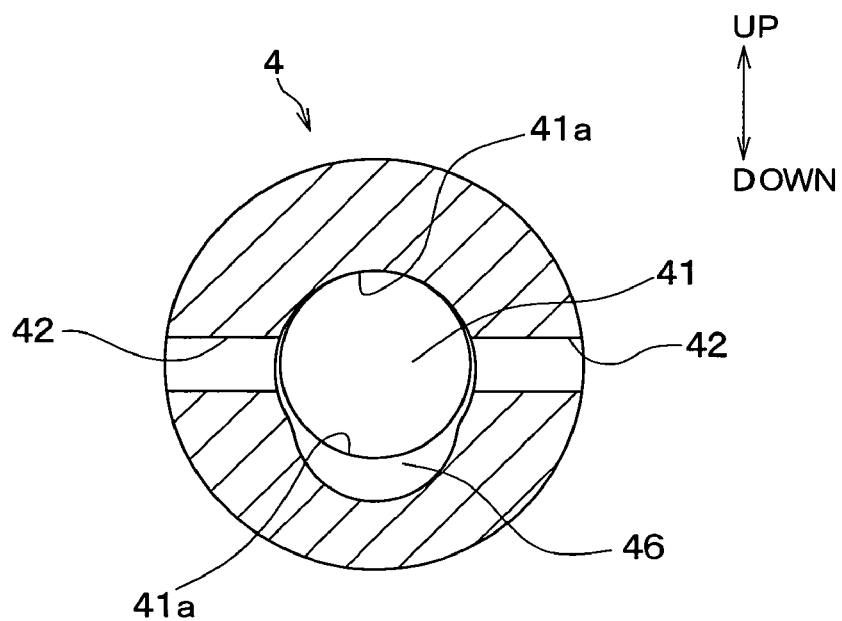
FIG. 13 is a cross sectional view of the housing shown in FIG. 12 taken along line F-F.
Figure 14:
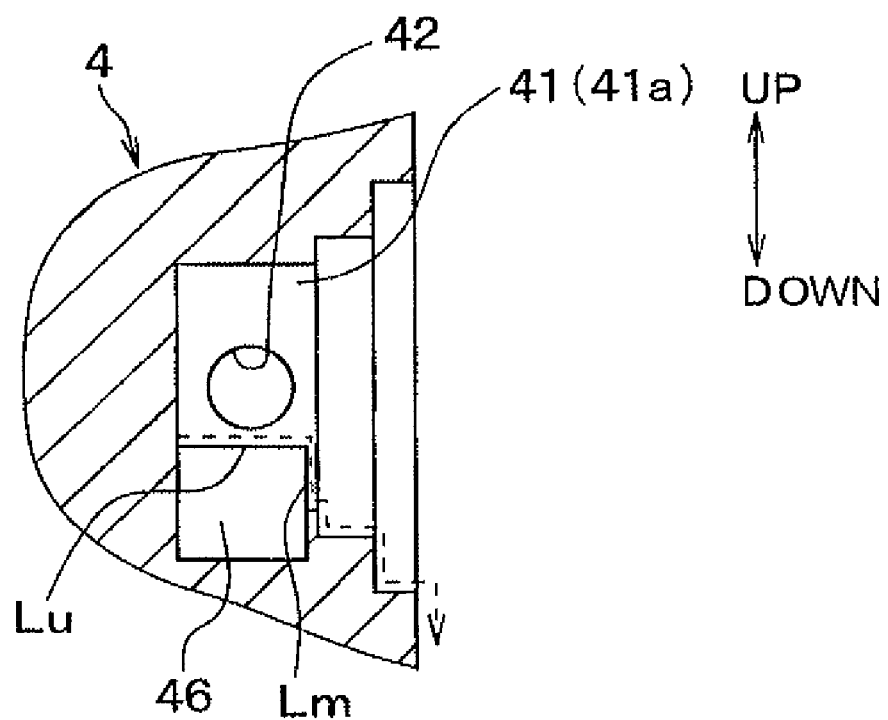
FIG. 14 is a cross sectional view for showing a configuration of a housing included in a piston pump according to related art.

The following describes a fifth embodiment of the present invention. FIG. 12 is a cross sectional view for showing a configuration of a housing included in a piston pump and how to process a fluid reservoir according to the fifth embodiment. FIG. 13 is a cross sectional view of the housing shown in FIG. 12 taken along line F-F. The elements that are the same as, or equivalent to, those in the first embodiment will be referred to using the same reference characters, and explanation thereof will be omitted.

As described in detail below, the shape and the positional arrangement of the fluid reservoir 46 according to the fifth embodiment are different from those according to the first embodiment.

As shown in FIG. 12 and FIG. 13, according to the present embodiment, the cutting tool 12 that has a circular cylindrical shape with a constant diameter is used to form the fluid reservoir 46. The fluid reservoir 46 is formed to have enough space for the upper edge Lu to be positioned above the upper end of the cam-chamber-side opening portion of the piston bore 42.

Thus, the fluid reservoir 46 is directly linked for allowing communication to the cam-chamber-side opening portion of the piston bore 42. In other words, the cam-chamber-side opening portion of the piston bore 42 is directly open to the fluid reservoir 46.

With this arrangement, because the brake fluid that has leaked into the cam chamber 41 directly flows into the fluid reservoir 46 from the cam-chamber-side opening portion of the piston bore 42, it is possible to prevent the brake fluid from flowing into the internal space within the electric motor 5. Accordingly, it is possible to prevent the wear of the brush included in the electric motor 5, the wear being caused by the brake fluid that has leaked into the cam chamber 41.

Other Embodiments

In the description of the embodiments above, the examples in which the present invention is applied to a pump included in a vehicular brake fluid pressure controlling device are explained; however, it is possible to use the pump according to the present invention for other purposes.

While the above description is of the preferred embodiments of the present invention, it should be appreciated that the invention may be modified, altered, or varied without deviating from the scope and fair meaning of the following claims.

What is claimed is:
1. A piston pump comprising:
   a housing;
   an electric motor connected to the housing, wherein the electric motor is installed in a vehicle in which a rotation shaft of the electric motor is substantially horizontal;
   a cam that rotates together with the electric motor; and
   a piston that reciprocates in accordance with the rotation of the cam so that fluid is drawn and discharged,
   wherein the housing includes
   a cam chamber in which the cam is housed, wherein the cam chamber is shaped like a circular cylindrical hollow and extends horizontally and parallel to the axis of the rotation shaft, the cam chamber has first and second ends, which are opposite to one another, and the first end of the cam chamber, which is relatively closer than the second end of the cam chamber to the electric motor, is open, and the second end of the cam chamber is closed;
   a piston bore, in which the piston is located, wherein one end of the piston bore is open to a side wall surface of the cam chamber that surrounds an axis of the rotation shaft; and
   a fluid reservoir that is formed by a depression in a bottom side of the side wall surface of the cam chamber, wherein the fluid reservoir is configured to retain fluid that has leaked into the cam chamber from the piston bore, and an edge is formed between the bottom side of the side wall surface of the cam chamber and the fluid reservoir, and a section of the edge that is located closer to the first end of the cam chamber than the piston bore extends downward beneath the piston bore toward the second end of the cam chamber.

2. The piston pump according to claim 1, wherein the section of the edge that is located closer to the first end of the cam chamber than the piston bore and another section of the edge, which is located on a side of the piston bore that is near to the second end of the cam chamber, extend continuously downward toward the second end of the cam chamber.

3. The piston pump according to claim 1, wherein the edge has a first end, which corresponds to the first end of the cam chamber, and the first end of the edge is closer to the first end of the cam chamber than any part of the piston bore.

* * * * *